United States Patent [19]
Hashimoto et al.

[11] Patent Number: 5,955,198
[45] Date of Patent: Sep. 21, 1999

[54] TRANSPARENT TOUCH PANEL

[75] Inventors: Koji Hashimoto, Katano; Toshiharu Fukui, Nara; Akira Nakanishi; Fuminori Umemura, both of Hirakata; Hideaki Nishida, Daito; Mitsuru Harada, Katano; Kazunori Omoya, Hirakata; Takashi Obayashi, Yao, all of Japan

[73] Assignee: Matsushita Electric Co., Ltd., Osaka, Japan

[21] Appl. No.: 08/919,267

[22] Filed: Aug. 28, 1997

Related U.S. Application Data

[63] Continuation of application No. 08/497,798, Jul. 3, 1995, abandoned.

[30] Foreign Application Priority Data

Jul. 4, 1994 [JP] Japan .................................. 6-152170

[51] Int. Cl.⁶ .................................................. B32B 27/38
[52] U.S. Cl. ...................... 428/414; 428/327; 178/18.03; 178/19.01; 178/20.01
[58] Field of Search .................................. 428/327, 414; 178/18.03, 19.01, 20.01

[56] References Cited

U.S. PATENT DOCUMENTS

| | | | |
|---|---|---|---|
| 4,707,570 | 11/1987 | Ide et al. | 178/18 |
| 4,958,148 | 9/1990 | Olson | 340/712 |
| 4,963,417 | 10/1990 | Taniguchi et al. | 428/327 |
| 4,990,900 | 2/1991 | Kikuchi | 178/18 |
| 5,399,604 | 3/1995 | Sano et al. | 526/329.2 |
| 5,543,587 | 8/1996 | Ikura et al. | 178/18 |

FOREIGN PATENT DOCUMENTS

| | | |
|---|---|---|
| 0 297 625 | 1/1989 | European Pat. Off. . |
| 0 534 376 | 3/1993 | European Pat. Off. . |
| 63-220314 | 9/1988 | Japan . |

OTHER PUBLICATIONS

Patent Abstracts of Japan, vol. 950, No. 004 (JP–07 092674, Apr. 7, 1995) (Abstract).

*Primary Examiner*—Randy Gulakowski
*Attorney, Agent, or Firm*—McDermott, Will & Emery

[57] ABSTRACT

This invention aims to offer a transparent touch panel that functions with a soft touching pressure by a pen or a finger, at the same time assures a long operating life.

The transparent touch panel comprises a base plate having a transparent electro conductive layer, a top plate having a transparent electro concuctive layer, and a plurality of dot spacers located in between the base plate and the top plate.

By a touch pressure given from the outer surface of the top plate, the transparent electro conductive layer placed in the top plate touches to the transparent electro conductive layer placed in the base plate, and the place touched is detected. What this touch panel specifically features is that it comprises dot spacers made of a composite resin containing a flexible modified epoxy resin. Hardness of the dot spacer is preferably not more than 95 according to JIS-K6301-A.

15 Claims, 1 Drawing Sheet

TRANSPARENT TOUCH PANEL

This is a continuation application of application Ser. No. 08/497,798 filed Jul. 3, 1995, abandoned.

BACKGROUND OF THE INVENTION

This invention relates to a transparent touch panel, which may be attached on display devices such as liquid crystal display panel enabling an operator to input by a pressure with finger or pen while viewing what is displayed on the panel.

There have been various types of panels proposed as the transparent touch panel to be used with electronic apparatus or other equipment; such as the resistance layer type, electro static capacitance type, sensor type, etc.

A standard model of transparent touch panel is described below, referring to drawing. FIG. 1 shows a cross sectional view of the essential part of a standard transparent touch panel. In FIG. 1, base plate 1 is a 0.1–3 mm thick substrate made of glass or a transparent high polymer, for example, polyethylene terephthalate, polycarbonate, polyacrylate, etc. Top plate 2 is a 0.1–0.5 mm thick substrate made of glass or a transparent high polymer, for example, polyethylene terephthalate, polycarbonate, polyacrylate, etc. On the inner surface of the base plate 1 is a transparent electro conductive layer 3, and on the inner surface of the top plate 2 is a transparent electro conductive layer 4; positioned with the electro conductive layer 3 and the electro conductive layer 4 facing to each other. Dot spacers 5 are placed between the base plate 1 and the top plate 2 with a certain interval there between in order to provide a clearance between the base plate 1 and the top plate 2. The base plate 1 and the top plate 2 are fixed by means of adhesive body 6 made up of an adhesive of epoxy resin or acrylic resin, or a tack agent of polyvinyl alcohol, polyacrylate, etc.

With the above mentioned constitution, the operation of standard transparent touch panel is explained herewith. When the upper surface of top plate 2 is pressed with a finger or a pen, the dot spacer 5 deforms allowing the transparent electro conductive layer 4 placed underneath the top plate 2 to touch the transparent electro conductive layer 3 located on the upper surface of the base plate 1, and an electric signal is obtained.

Now, in the following, a conventional transparent touch panel is described. In the constitution of a transparent touch panel as shown in FIG. 1, conventional dot spacers employed a soft silicone rubber material in order to enable the top plate 2 work with a soft touching.

However, the conventional transparent touch panel comprising dot spacers made of a soft silicone rubber material has a problem in durability over a long time of service; namely, during the operating life, the dot spacer itself deteriorates significantly and easily peels off from the plate.

SUMMARY OF THE INVENTION

This invention discloses a transparent touch panel that works with a light touching pressure, and at the same time assures a long operating life.

The transparent touch panel according to this invention comprises a transparent touch panel, wherein a contact position is detected by bringing a pair of plates, having transparent electro conductive bodies positioned thereon facing each other with the dot spacers in between, into contact with each other by a touch pressure. The dot spacers are made of a composite resin, including a flexible modified epoxy resin. It is desirable that the hardness of the composite resin is not more than 95 in terms of Japan Industrial Standard(abbreviated as JIS hereafter), K6301-A.

The modified epoxy resin is created through the chemical reaction of a modified epoxy compound and a curing agent.

As to the modified epoxy compound, the following may be used an epoxy compound modified with a rubber component, for example urethane rubber, polybutadiene, polyisoprene, polyacrylonitrile-butadiene, nitrile rubber, etc.; an epoxy compound modified with polyether; an epoxy compound modified with fatty acid or fatty acid involving conjugated double bond; an epoxy compound modified with polythiol; an epoxy compound modified with silicone resin; and others.

As to the curing agent, there is no special limitation. Compounds that harden through the chemical reaction with the aforementioned compounds may be used. For example, amine compound, amide compound, organic acid compound, acid anhydride compound, etc. may be used as the curing agent.

Besides the above-identified modified epoxy resins, a composite resin including ordinary bisphenol type epoxy resin may also be used.

Further, as to the modified epoxy resins, a composite resin including organic polymer compound may also be used.

In addition to the modified epoxy resins, a composite resin including a filler may also be used.

As pointed out in greater detail below, the use of improved dot spacer having a high degree of elasticity in a transparent touch panel provides important advantages.

Specifically, the input operation or contacting of he bodies can be performed by softly touch-pressing the panel surface with a finger or a pen. At the same time, the amount of pressure applied to the top plate when the plate is pressed to make contact with the base plate is alleviated or lessened resulting in the favorable effect of preventing the breakage of the transparent electro conductive layer placed in the top plate. In addition, because of the higher withstanding capability of the dot spacer against wear, the permanent deformation of the dot spacer after repeated touching is minimized, bringing about a remarkably improved operating durability. On to of the above mentioned advantages, because of the higher adhesion strength of the modified epoxy resin, the peeling off of a dot spacer from a plate is suppressed.

With the constitution according to the present invention, touch panel that realizes the aforementioned advantages all at once may be implemented.

The invention itself, together with further objects and attendant advantages, will best be understood by reference to the following detailed description taken in conjunction with the accompanying drawings.

Figure 1:
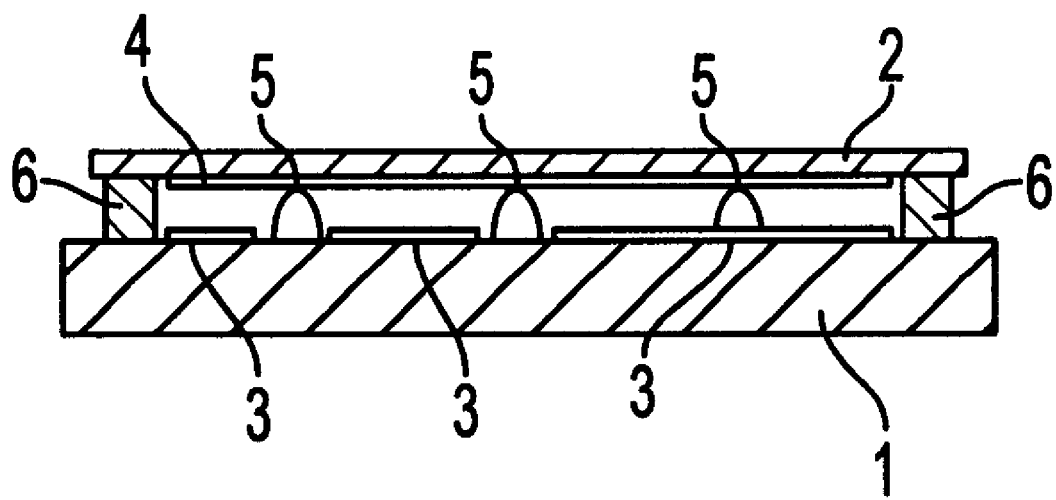
FIG. 1 shows a cross sectional view of the essential part of a transparent touch panel according to this invention.

Explanation of the numerals:

1—Base plate
2—Top plate
3—Transparent electro conductive layer placed on the inner surface of the base plate
4—Transparent electro conductive layer placed to the inner surface of the top plate 5—Dot spacers
6—Adhesive body

DETAILED DESCRIPTION OF THE INVENTION

Now, in the following, a transparent touch panel according to this invention is explained, by describing different embodiment cases. The constitution of the essential part of the transparent touch panel in the present embodiments is almost equal to that shown in FIG. 1, referred to when a standard technology was described, except that the present invention employs different kinds of materials for the dot spacers.

In FIG. 1, the transparent touch panel comprises a base plate 1, a top plate 2 and a plurality of dot spacers 5 installed at specified points between the base plate 1 and top plate 2. The dot spacers 5 are installed within a certain interval having a specified height in order to assure a clearance between the base plate 1 and top plate 2. On the inner surface of base plate 1 is transparent electro conductive layer 3, and on the inner surface of top plate 2 is transparent electro conductive layer 4. the transparent electro conductive layer 3 and the transparent electro conductive layer 4 are placed facing to each other. The base plate 1 and top plate 2 are fixed together at their circumference with the adhesive body 6.

When the outer surface of top plate 2 is pressed with a finger or a pen, the dot spacer 5 deforms, allowing the transparent electro conductive layer 4 placed on the top plate 2 to touch the transparent electro conductive layer 3 placed on the base plate 1. As the result, an electric signal corresponding to the pressed location is obtained.

As to the material of the base plate 1 and top plate 2, there is no specific limitation. For example, glass or a transparent polymer material such as polyethylene terephthalate (abbreviated as PET hereafter), polycarbonate, polyacrylate, etc., are normally used.

The thickness of the base plate 1 is, for example, about 0.1 mm to about 3 mm; that of the top plate 2 is, for example, about 0.1 mm to about 0.5 mm.

As to the material of the transparent electro conductive layers 3, 4, indium tin oxide(abbreviated as ITO), tin oxide ($SnO_2$), etc. may be used; the thickness of which is about 0.1 um–0.2 um.

As to the material of the adhesive body 6, there is no specific limitation; for example, an adhesive of epoxy resin group or acrylic resin group, or a tack agent such as polyvinyl alcohol, polyacrylate, etc. may be used.

As the material of the dot spacer 5, a composite resin containing at least a flexible modified epoxy resin is provided. The desirable hardness of the composite resin is not more than 95 in terms of JIS K6301-A; the hardness especially preferred is between 40–95. The test method as specified by JIS K6301,A is almost equivalent to that of American Society of Testing Materials(ASTM) D2240, and the values of hardness in these specifications are almost identical.

The flexible modified epoxy resin is prepared through the chemical reaction of a modified epoxy compound and a curing agent. When necessary, a curing catalyzer may be used.

As to the modified epoxy compound, at least one out of the following group of modified compounds may be used:
(1) Rubber-modified epoxy compound
   Epoxy compounds modified with rubber component, such as nitrile rubber, urethane rubber, polybutadiene, polyisoprene, polyether rubber, or butadiene-acrylonitrile-copolymer.
(2) Polyether-modified epoxy compound
   Polyether modified epoxy compounds modified with poly alkyl ether component, such as polyethylene glycol or polypropylene glycol, etc.
(3) Fatty-acid-modified epoxy compound
   Epoxy compounds modified with fatty acid having long chain alkyl group such as stearic acid, oleic acid, etc., or alkylen group containing conjugated double bond.
(4) Silicone-modified epoxy compound
   Epoxy ccompounds modified with silicone resin component such as polysiloxane, etc.
(5) Polythiol-modified epoxy compound
   Polythiol modified epoxy resins modified with polythiol as indicated by —R—S—R—S—R—(R:alkyl group, S:sulfur atom)

In addition to these modified epoxy compounds, ordinary epoxy compounds may be used jointly. Examples of the ordinary epoxy compounds as referred to above include bisphenol type epoxy compounds, novolak type epoxy compounds, cyclo-aliphatic epoxy compounds, biphenyl type epoxy compounds, naphthalene type epoxy compounds, glycidyl ester type epoxy compounds, glycidyl amine type epoxy compounds, etc.

Further, as the reactive type diluent, stylene oxide, butyl glycidyl ester, carboxylic glycidyl ester, etc. may be used jointly. Especially, the use of a compound having a long chain glycidyl group facilitates a flexible epoxy resin.

Examples of the curing agent, or curing catalyzer for the epoxy compound include, amine, polyamine, amine aduct, amine salt, polyamide, imidazol derivative, dicyanodiamide, urea compound, melamine derivative, Lewis acid, ketimine, acid hydrazide, acid anhydride, polythiol, sulfide derivative, phenol resin, amino resin, etc.

Besides the aforementioned modified epoxy resin, a composite resin containing an auxiliary additive such as an organic polymer compound, inorganic filler, plasticizer, thixotropic agent, coupling agent, leveling agent, etc. is also possible.

By the addition of the organic polymer compound or inorganic filler, the mechanical strength and hardness of a dot spacer is adjusted.

Examples of the organic polymer compound include, rubbers such as polybutadiene, polychloroprene, polynitrilebutadiene, natural rubber, etc,; rubbers containing filler; thermoplastic resin such as fluoro carbon resin, polystyrene, polyvinyl acetate, polyvinyl butyral, polyacrylic ester, poly metacrylic ester, polyvinyl chloride, celluloses, polyether, polyester, polyamide, polycabonate, etc.; and thermosetting resin such as phenol resin, amino resin, urethane resin, silicone resin, polyester resin, polyimide resin, etc. Rubbers, among others, have a significant effect.

As to the inorganic filler, metal oxides such as silica, alumina, etc.; metal carbonate compounds such as calcium carbonate, etc.; metal sulfate compounds such as barium sulfate, etc.; metal silicate compounds such as talc, etc. for example, are used.

The plasticizer functions to give softness to the epoxy resin; alkyl phthalate, epoxylized phthalate ester, epoxylized unsaturated fatty acid, etc. serve this purpose.

The coupling agent functions to enhance the adhesion strength between the epoxy resin and filler, and to raise the mechanical strength of the composite resin. Glycidyloxy propyl trimethoxy silane, for example, is used for this purpose.

The thixotropic agent functions to adjust the viscosity of the liquid composite mixture before hardening; pulverized colloidal silica is also used for this purpose.

The transparent touch panel according to the present invention is manufactured, as an example, by the following process steps:

Modified epoxy compound, ordinary epoxy compound, diluent, curing agent, curing catalyst, organic polymer compound, filler, coupling agent, thixotropic agent, plasticizer, leveling agent, solvent, etc. are mixed to obtain a mixture in a paste state or an ink state. The organic polymer compound is mixed as a liquid dissolved in a solvent, or as a filler. The mixture, thus prepared, is applied on the electro conductive layer of either the top plate 2 or the base plate 1, on which the electro conductive layer has already been placed, by means of a printing procedure or by other processes. Then, the mixture is cured through chemical reaction by heating or other treatment. Then, the solvent evaporates.

In this way, the dot spacers are shaped to have a certain interval or height. Later, the top plate 2 and base plate 1 are fixed together with the adhesive body in between. The transparent touch panel is manufactured through the above mentioned process steps.

Now in the following, different practical embodiment cases of the transparent touch panel according to the present invention are described. The description of each embodiment also includes a report on the following factors: the operating force, the operating life, the breakage of the transparent electro conductive layer and the hardness of the dot spacers of the transparent touch panel. These factors were measured with the following methods:

Measurement of the operating force

The touch panel is pressed on the outer surface of the top plate at the center from each of the dot spacers with a silicone rubber rod(having a spherical end, R 3.75 mm, hardness 10–20). When the top plate 2 and base plate 1 make electrical contact, the load or pressure applied is measured.

Measurement of the operating life

The touch panel is pressed on the outer surface of the top plate at the center from each of the dot spacers with a silicone rubber rod(having a spherical end, R 3.75 mm, hardness 10–20), two times per second with 300 g load. When the height of dot the spacer is reduced by 10% from the initial value, the number of pressings is counted.

Observation of breakage of the transparent electro conductive layer of the input plate The touch panel is pressed on the outer surface of the top plate(input plate) at the center from each of the dot spacers with a silicone rubber rod(having a spherical end, R 3.75 mm, hardness 10–20), two times per second with 300 g load. After 2 million pressings, the transparent electro conductive layer is observed to determine whether or not the layer is damaged.

Measurement of hardness of a dot spacer

The dot spacer is measured with respect to hardness according to the measuring method specified in Japan Industrial Standard K6301-A. Namely, using the type A spring hardness tester, a needle is placed on a test piece, perpendicularly to its surface, and the scale is read. This test method is almost identical to that of American Society of Testing Materials(ASTM) D2240. Therefore the hardness value as measured according to JIS K6301 is almost equal to that measured according to ASTM D2240.

Embodiment 1

Nitrile modified epoxy compound: TSR 930 (Dainippon Ink)

Ordinary bisphenol type epoxy compound: EPIKOTE 807 (Shell)

Curing agent: Dicyanodiamide

Thixotropic agent: aerosil 200 (Nihon Aerosil, pulverized colloidal silica)

The above constituent materials, containing both the modified epoxy compound and ordinary epoxy compound, have been used to prepare experimental samples, with the proportions as specified in Table 1. The prescribed liquid has been applied, using a printing method, on the surface of the electro conductive layer of the base plate(boric silicate glass, 200 mm width, 250 mm length, 1.9 mm thickness), the transparent electro conductive layer(tin oxide, 0.2 um thickness) having been formed on the base plate. Then through a curing process, a plurality of dot spacers are provided, fixed on said layer of the base plate, (8 mm dot pitch, 30 um high). Next, epoxy adhesive is applied on the circumference of the base plate having the dot spacers, and then the top plate(boric silicate glass, 199 mmW, 249 mmL, 0.2 mmT), on which another transparent electro conductive layer(tin oxide, 0.2 umT) had been formed, is superposed and glued together. In this way, the transparent touch panels, as shown in FIG. 1, were obtained.

These touch panels have been measured with respect to the following characteristics or items: the force needed to operate, operating life, occurrence of breakage in the transparent electro conductive layer, hardness of the dot spacer, etc. The results are as shown in Table 1.

TABLE 1

| | experiment No. | 1 | 2 | 3 | 4 | 5 |
|---|---|---|---|---|---|---|
| composition of dot spacer (wt %) | modified epoxy compound: TSR-930 | 90 | 70 | 50 | 30 | 0 |
| | ordinary epoxy compound: EPIKOTE-807 | 0 | 20 | 40 | 60 | 90 |
| | curing agent: dicyanodiamide | 5 | 5 | 5 | 5 | 5 |
| | thixotropic agent: aerosil-200 | 5 | 5 | 5 | 5 | 5 |
| hardness of dot spacer | JIS-K6301-A-type (ASTM D2240) | 60 | 80 | 95 | 99 | 118 |
| characteristics of transparent touch panel | operating force (Newton_) | 1.0 | 1.2 | 1.4 | 2.2 | 2.5 |
| | operating life (touches) | over 2 mil. | over 2 mil. | over 2 mil. | over 2 mil. | over 2 mil. |
| | broken electro conductive layer | no | no | no | yes | yes |
| | peeled off dot spacer | no | no | no | no | no |

According to the results shown in Table 1, the touch panels comprising dot spacers having a hardness which is lower than JIS-A-95 (Experiment Nos. 1–3), need a small force for operating; have an operating life of more than 2 million touchings; show no breakage in the transparent These touch panels have been measured with respect to the following characteristics or items: the force needed to operate, operating life, occurrence of breakage in the transparent electro conductive layer, hardness of the dot spacer, etc. The results are as shown in Table 2.

TABLE 2

| | experiment No. | 6 | 7 | 8 | 9 | 10 | 11 |
|---|---|---|---|---|---|---|---|
| composition of dot spacer (wt %) | modified epoxy compound: EPIKOTE-871 | 70 | 60 | 55 | 40 | 20 | 0 |
| | ordinary epoxy compound: EPIKOTE-807 | 0 | 10 | 30 | 30 | 50 | 70 |
| | dicyanodiamide | 4 | 4 | 4 | 4 | 4 | 4 |
| | organic polymer: Vyron-300 | 8 | 8 | 8 | 8 | 8 | 8 |
| | plasticizer: di-isononyl phthalate | 15 | 15 | 0 | 15 | 15 | 15 |
| | coupling agent: A-187 | 3 | 3 | 3 | 3 | 3 | 3 |
| hardness of dot spacer | JIS-K6301-A-type (ASTM D2240) | 30 | 38 | 85 | 75 | 90 | 96 |
| characteristics of transparent touch panel | operating force (Newton_) | 0.7 | 0.8 | 1.3 | 1.3 | 1.4 | 1.6 |
| | operating life (touches) | 1.5 mil. | 1.7 mil. | over 2 mil. | over 2 mil. | over 2 mil. | over 2 mil. |
| | broken electro conductive layer peeled off dot spacer | no | no | no | no | no | no | electro conductive layer; and show no peeling off of the dot spacers.

In contrast, the touch panels, comprising dot spacers having a hardness which is higher than JIS-A-96 (Experiment Nos. 4, 5), need a larger force for operating; and the transparent electro conductive layer was observed to be broken.

Embodiment 2

Fatty-acid-modified epoxy compound: EPIKOTE 871 (Shell)

Ordinary bisphenol type epoxy compound: EPIKOTE 807(Shell)

Organic polymer compound: Vyron 300 (Toyobo, polyester resin in solvent)

Curing agent: Dicyanodiamide

Plasticizer: Diisononyl phthalate

Coupling agent: A187(Nihon Unicar)

The above constituent materials, containing modified epoxy compound, ordinary epoxy compound, organic polymer compound, plasticizer, etc. have been used to prepare experimental samples, with the proportions as specified in Table 2. The prescribed liquid has been applied, using a printing method, on the surface of the electro conductive layer of the base plate(boric silicate glass, 200 mmW, 250 mmL, 1.9 mmT), the transparent electro conductive layer(tin oxide, 0.2 umT) having been formed on the base plate. Then, through curing by heating, a plurality of dot spacers are provided, fixed on the base plate, (8 mm dot pitch, 30 um high). Next, epoxy adhesive is applied on the circumference of base plate having the dot spacers, and then the top plate(boric silicate glass, 199 mmW, 249 mmL, 0.2 mmT), on which another transparent electro conductive layer(tin oxide, 0.2 umT) had been formed, is superposed and glued together. In this way, the transparent touch panels, as shown in FIG. 1, were obtained.

According to the results shown in Table 2, the touch panels, comprising dot spacers having a hardness which ranges between 45–95 of JIS-A (Experiment Nos. 8–10), need a small force for operating; have an operating life of more than 2 million touchings; show no breakage in the transparent electro conductive layer; and show no peeling off of the dot spacers.

The operating life of the touch panels, comprising dot spacers having a hardness which is lower than 44 of JIS-A (Experiment Nos. 6, 7), is 1.5–1.7 million touchings.

In contrast, the touch panel comprising dot spacers having a hardness which is higher than 96 of JIS-A (Experiment No. 11) needs a larger force for operating; and the transparent electro conductive layer was observed to be broken.

Embodiment 3

Polyether-modified epoxy compound: Denakor EX931 (Nagase): 50%

Bisphenol type epoxy compound: EPIKOTE 828(Shell): 30%

Curing agent: Hydrazyl adipate: 11%

Inorganic filler: Barium sulfate powder: 8%

Leveling agent: Polyether silicone: 1%

The above constituent materials, containing modified epoxy compound, ordinary epoxy compound and filler, have been used to prepare experimental samples, with the proportions as specified in Table 3. The prescribed liquid has been applied, using a printing method, on the surface of the electro conductive layer of the base plate(boric silicate glass, 200 mmW, 250 mmL, 1.9 mmT), the transparent electro conductive layer(indium tin oxide, 0.2 umT) having been on the base plate. Then, through a curing porcess, a plurality of dot spacers are provided, fixed on said layers the base plate, (8 mm dot pitch, 30 um high). Next, acrylic tack agent is applied on the circumference of the base plate having the dot spacers, and then the top plate(polyethylene terephthalate (PET), 199 mmW, 249 mmL, 0.2 mmT), on which the transparent electro conductive layer(indium tin oxide, 0.2 umT) had been formed, is superposed and glued together. In this way, the transparent touch panels as shown in FIG. 1, were obtained.

These touch panels have been measured with respect to the following characteristics or items: the force needed to operate, operating life, occurrence of breakage in the transparent electro conductive layer, hardness of the dot spacer, etc. The results are as shown in Table 3.

Organic polymer compound: Vyron 300 (Toyobo, polyester resin in solvent), 8 wt %
   Plasticizer: Diisononyl phthalate, 15 wt %
   Curing agent: Dicyanodiamide, 4%
   Coupling agent: A187 (Nihon Unicar), 3 wt %
   Dot spacer (B) has been obtained by curing the above mixture.

(3) Dot spacer (C)
   Polyether-modified epoxy compound: Denakor EX931 (Nagase) 50 wt %

TABLE 3

| | experiment No. | 12 | 13 | 14 | 15 | 16 | 17 |
|---|---|---|---|---|---|---|---|
| composition of dot spacer (wt %) | modified epoxy compound EX-931 | 80 | 65 | 50 | 35 | 20 | 0 |
| | ordinary epoxy compound EPIKOTE-828 | 0 | 15 | 30 | 45 | 60 | 80 |
| | hydrazyl adipate | 11 | 11 | 11 | 11 | 11 | 11 |
| | barium sulfate | 8 | 8 | 8 | 8 | 8 | 8 |
| | polyether silicone | 1 | 1 | 1 | 1 | 1 | 1 |
| hardness of dot spacer | JIS-K6301-A-type (ASTM D2240) | 47 | 52 | 55 | 88 | 97 | 110 |
| characteristics of transparent touch panel | operating force (Newton) | 0.92 | 0.95 | 0.98 | 1.5 | 2.1 | 2.6 |
| | operating life (touches) | over 2 mil. | over 2 mil. | over 2 mil. | over 2 mil. | over 2 mil. | over 2 mil. |
| | broken electro conductive layer | no | no | no | no | yes | yes |
| | peeled off dot spacer | no | no | no | no | no | no |

According to the results shown in Table 3, the touch panels, comprising dot spacers having a hardness which is within the range 45–95 of JIS-A (Experiment Nos. 12–15), need a small force for operating; have an operating life of more than 2 million touchings; show no breakage in the transparent electro conductive layer; and no peeling off of the dot spacers.

In contrast, the touch panels comprising dot spacers having a hardness which is higher than JIS-A96 (Experiment Nos. 16,17), need a larger operating force; and the transparent electro conductive layer was observed to be broken.

Embodiment 4

The following dot spacers (A)–(E) have been prepared:
(1) Dot spacer (A)
   Nitrile-modified epoxy compound: TSR 930 (Dainippon Ink),70 wt %
   Bisphenol type epoxy compound: EPIKOTE 807 (Shell), 20 wt %
   Curing agent: Dicyanodiamide, 5 wt %
   Thixotropic agent: aerosil 200 (Nihon Aerosil, pulverized silica), 5 wt %
   Dot spacer (A) has been obtained by curing the above mixture.

(2) Dot spacer (B)
   Fatty-acid-modified epoxy compound: EPIKOTE 871 (Shell), 40 wt %
   Bisphenol type epoxy compound: EPIKOTE 807 (Shell), 31 wt %
   Bisphenol type epoxy compound: EPIKOTE 828 (Shell), 30 wt %
   Curing agent: Dihydrazide adipate, 11 wt %
   Inorganic filler: Barium sulfate powder, 8 wt %
   Leveling agent: Polyether silicone, 1 wt %
   Dot spacer (C) has been obtained by curing the above mixture.

(4) Dot spacer (D)
   Silicone resin: XE14-648 (Toshiba Silicone, a silicone resin with methoxy-siloxysane as main component)

(5) Dot spacer (E)
   Bisphenol type epoxy compound: EPIRITE 1000-3 (Jyujo Kako), 75 wt %
   Curing agent: EPIRITE No. 2, 25 wt %
   Dot spacer (E) has been obtained by curing the above mixture.

By using each one of the dot spacers (A)–(E), experimental transparent touch panels (Nos. 18–29) have been fabricated, as described in Table 4 and Table 5.

These touch panels have been measured with respect to the following characteristics or items: the force needed to operate, operating life, occurrence of breakage in the transparent electro conductive layer, peeling off of the dot spacer, etc. The results are given in Tables 4 and 5.

TABLE 4

| | experiment No. | 18 | 19 | 20 | 21 | 22 | 23 |
|---|---|---|---|---|---|---|---|
| materials | base plate (1.9 mmT) | soda glass | soda glass | soda glass | soda glass | soda glass | soda glass |

TABLE 4-continued

| experiment No. | | 18 | 19 | 20 | 21 | 22 | 23 |
|---|---|---|---|---|---|---|---|
| | top plate (0.2 mmT) | boric silicate glass | boric silicate glass | PET | boric silicate glass | boric silicate glass | PET |
| | electro conductive layer (0.2 μmT) | ITO | SnO$_2$ | ITO | ITO | SnO$_2$ | ITO |
| | adhesive | acrylic tack agent | epoxy resin | acrylic tack agent | acrylic tack agent | epoxy resin | acrylic tack agent |
| | dot spacer (30 μmH, 8 mm pitch) | (A) | (A) | (A) | (B) | (B) | (B) |
| hardness of dot spacer | JIS-K6301 A-type (ASTM D2240) | 80 | 80 | 80 | 75 | 75 | 75 |
| characteristics of transparent touch panel | operating force (Newton) | 1.4 | 1.4 | 0.98 | 1.3 | 1.3 | 0.98 |
| | operating life (touches) | over 2 mil. | over 2 mil. | over 2 mil. | over 2 mil. | over 2 mil. | over 2 mil. |
| | broken electro conductive layer | no | no | no | no | no | no |
| | peeled off dot spacer | no | no | no | no | no | no |

TABLE 5

| experiment No. | | 24 | 25 | 26 | 27 | 28 | 29 |
|---|---|---|---|---|---|---|---|
| materials | base plate (1.9 mmT) | soda glass | soda glass | soda glass | soda glass | soda glass | soda glass |
| | top plate (0.2 mmT) | boric silicate glass | boric silicate glass | PET | boric silicate glass | PET | boric silicate glass |
| | electro conductive layer (0.2 μmT) | ITO | SnO$_2$ | ITO | ITO | ITO | ITO |
| | adhesive | epoxy resin | epoxy resin | acrylic tack agent | epoxy resin | acrylic tack agent | epoxy resin |
| | dot spacer (30 μmH, 8 mm pitch) | (C) | (C) | (C) | (D) | (D) | (E) |
| hardness of dot spacer | JIS K6301 A-type (ASTM D2240) | 55 | 55 | 55 | 45 | 45 | 98 |
| characteristics of transparent touch panel | operating force (Newton) | 1.3 | 1.3 | 0.98 | 1.3 | 0.98 | 2.5 |
| | operating life (touches) | over 2 mil. | over 2 mil. | over 2 mil. | 100,000 | 300,000 | over 2 mil. |
| | broken electro conductive layer | no | no | no | no | no | yes |
| | peeled off dot spacer | no | no | no | yes | yes | no |

According to the results shown in Tables 4 and 5, the touch panels, comprising dot spacers having a hardness which is lower than JIS-A-95 (Experiment Nos. 18–26), need a small force for operating; have an operating life of more than 2 million touchings; show no breakage in the transparent electro conductive layer; and show no peeling off of the dot spacers.

In contrast, the transparent touch panel, comprising dot spacers having a hardness which is higher than JIS-A-96

(Experiment No. 29) needs a larger operating force; and the transparent electro conductive layer was observed to be broken.

The touch panels comprising dot spacers made of silicone resin (Experiment Nos 27, 28) have a shorter operating life; and show peeling off of the dot spacers.

Embodiment 5

Liquids have been prescribed to contain modified epoxy compound, bisphenol type epoxy compound, curing agent, organic polymer compound and inorganic filler with the proportions as specified in Table 6. Using the liquid mixture thus obtained, touch panels have been fabricated using the same method as in Embodiment 1.

Each of the touch panels has been measured with respect to the following characteristics or items: the force needed to operate, operating life, occurrence of breakage in the transparent electro conductive layer, peeling off of the dot spacer, etc. The results are shown in Table 6.

Further, because of the high adhesion strength of the dot spacers, the peeling off of the dot spacers is avoidable. With the constitution according to this invention, a transparent touch panel that offers such outstanding characteristics as described in the foregoing descriptions is implemented.

It is especially preferred to comprise such dot spacers having a hardness which is not more than 95 according to JIS-A test method (not more than 95 according to ASTM-D2240). By so doing, more enhanced advatages may be obtained.

What is claimed is:

1. A transparent touch panel comprising:
   (a) a base plate having a first transparent electro conductive layer on one of the surfaces thereof:
   (b) a top plate having a second transparent electro conductive layer on one of the surfaces thereof, wherein said base plate and said top plate are combined so that said first transparent electro conductive layer and said

TABLE 6

| | experiment No. | 30 | 31 | 32 | 33 | 34 | 35 |
|---|---|---|---|---|---|---|---|
| modified epoxy compound (wt %) | TSR-930 | 49 | 68 | — | — | — | — |
| | EPIKOTE-871 | — | — | 72 | 44 | — | — |
| | EX-931 | — | — | — | — | 71 | 48 |
| ordinary epoxy compound (wt %) | EPIKOTE-828 | 29 | 0 | 0 | 36 | — | 34 |
| curing agent (wt %) | trimethylaminomethylphenol (DMP-30) | 12 | 9 | 8 | 10 | 7 | 8 |
| filler (wt %) | silica powder | 10 | 13 | — | — | 12 | — |
| | talc powder | — | 10 | — | — | — | — |
| | calcium carbonate powder | — | — | 10 | — | 10 | — |
| organic polymer compound (wt %) | polyamide powder | — | — | — | — | — | 10 |
| | silicone resin powder | — | — | — | 10 | — | — |
| | rubber solution | — | — | 10 | — | — | — |
| hardness of dot spacer | JIS K6301 A-type (ASTM D2240) | 93 | 80 | 76 | 82 | 70 | 75 |
| characteristics of transparent touch panel | operating force (Newton) | 1.4 | 1.1 | 1.2 | 1.1 | 1.2 | 1.1 |
| | operating life (touches) | over 2 mil. | over 2 mil. | over 2 mil. | over 2 mil. | over 2 mil. | over 2 mil. |
| | broken elecyro conductive layer | no | no | no | no | no | no |
| | peeled off dot spacer | no | no | no | no | no | no |

According to the results shown in Table 6, the touch panels, comprising dot spacers having a hardness which is below 95 (Experiment Nos. 30–35), need a small force for operating; have an operating life of more than 2 million touchings; show no breakage in the transparent electro conductive layer; and show no peeling off of the dot spacers.

In the Embodiments 1–5, dot spacers 5 have been formed on the base plate 1. However, dot spacers 5 may be formed on electro conductive layer applied to the top plate 2 to obtain the same effect.

As described in the above mentioned Embodiments, the transparent touch panels, comprising dot spacers made of composite resin containing flexible modified epoxy resin provide the following functions and effects: Because of the fact that the dot spacer has a high degree of elasticity, the input operation or pressing of the top plate can be performed by softly touch-pressing the panel surface. After repeated touchings, the permanent deformation of the dot spacer is very small, and the operating durability is remarkably improved. Because of the alleviated or decreased operating force, the possible breakage of transparent electro conductive layer placed on the top plate is significantly preventable.

second transparent electro conductive layer face each other securing a certain specified clearance; and
(c) a plurality of dot spacers located in between said base plate and said top plate, said dot spacers made of a composite resin including a flexible modified epoxy resin,
wherein a pressure given from the other surface of said top plate makes said second transparent electro conductive layer placed on said top plate touch said first transparent electro conductive layer placed on said base plate to indicate a place where said pressure is given,
wherein each of said plurality of dot spacers is installed at a certain interval and with a predetermined height in order to insure a clearance between said base plate and said top plate,
wherein said modified epoxy resin is a resin created through a chemical reaction between a curing agent and at least one modified epoxy compound selected from the group consisting of rubber-modified epoxy compound, polyether-modified epoxy compound, fattyacid-modified epoxy compound, polythiol-modified epoxy compound, and silicone-resin-modified epoxy compound, wherein a hardness of said dot spacers is not more than 95 in accordance with the test method specified in JIS-K6301-A; and wherein said rubber-modified epoxy compound is modified epoxy compound modified with at least one selected from the group consisting of urethane rubber, polybutadiene rubber, polyisoprene rubber and polyether rubber.

2. A transparent touch panel according to claim 1, wherein said rubber-modified epoxy compound is an epoxy resin compound modified with a nitrile rubber.

3. A transparent touch panel comprising:

(a) a base plate having a first transparent electro conductive layer on one of the surfaces thereof;

(b) a top plate having a second transparent electro conductive layer on one of the surfaces thereof, where said base plate and said top plate are combined so that said first transparent electro conductive layer and said second transparent electro conductive layer face each other securing a certain specified clearance; and (c) a plurality of dot spacers located in between said base plate and said top plate, said dot spacers made of a composite resin created through reaction of a flexible modified epoxy compound, an ordinary epoxy compound and a curing agent, wherein a pressure given from the other surface of said top plate makes said second transparent electro conductive layer placed on said top plate touch said first transparent electro conductive layer placed on said base plate to indicate a place where said pressure is given, wherein each of said plurality of dot spacers is installed at a certain interval and with a predetermined height in order to insure a clearance between said base plate and said top plate, wherein said flexible modified epoxy compound is at least one selected from the group consisting of rubber-modified epoxy compound, polyether-modified epoxy compound, fatty-acid-modified epoxy compound, polythiol-modified epoxy compound, and silicone-resin-modified epoxy compound, wherein said rubber-modified epoxy compound is modified epoxy compound modified with at least one selected from the group consisting of urethane rubber, polybutadiene rubber, polyisoprene rubber and polyether rubber, and wherein a hardness of said dot spacers is not more than 95 in accordance with the test method specified in JIS-K6301-A.

4. A transparent touch panel according to claim 3, wherein said ordinary epoxy compound is at least one selected from the group consisting a bisphenol type epoxy compound, a novolak type epoxy compound, a cyclo-aliphatic epoxy compound, a naphthalene type epoxy compound, a glycidyl ester type epoxy compound and a glycidyl amine type epoxy compound.

5. A transparent touch panel comprising:

(a) a base plate having a first transparent electro conductive layer on one of the surfaces thereof;

(b) a top plate having a second transparent electro conductive layer on one of the surfaces thereof, wherein said base plate and said top plate are combined so that said first transparent electro conductive layer and said second transparent electro conductive layer face each other securing a certain specified clearance; and (c) a plurality of dot spacers located in between said base plate and said top plate, said dot spacers made of a composite resin including a modified epoxy resin and an auxiliary additive, having a hardness of not more than 95 according to JIS-K6301-A, wherein a pressure given from the other surface of said top plate makes said second transparent electro conductive layer placed on said top plate touch said first transparent electro conductive layer placed on said base plate to indicate a place where said pressure is given, wherein each of said plurality of dot spacers is installed at a certain interval and with a predetermined height in order to insure a clearance between said base plate and said top plate, wherein said modified epoxy resin is a resin created through a chemical reaction between a curing agent and at least one modified epoxy compound selected from the group consisting of rubber-modified epoxy compound, polyether-modified epoxy compound fatty-acid-modified epoxy compound polythiol-modified epoxy compound, and silicone-resin-modified epoxy compound, and wherein said rubber-modified epoxy compound is modified epoxy compound modified with at least one selected from the group consisting of urethane rubber, polybutadiene rubber, polyisoprene rubber and polyether rubber.

6. A transparent touch panel according to claim 5, wherein said auxiliary additive is at least one selected from the group consisting of a organic polymer compound, a filler, a plasticizer and a coupling agent.

7. A transparent touch panel according to claim 6, wherein said filler is at least one powder selected from the group consisting of barium sulfate, silica, talc and calcium carbonate.

8. A transparent touch panel comprising:

(a) a base plate having a first transparent electro conductive layer on one of the surfaces thereof;

(b) a top plate having a second transparent electro conductive layer on one of the surfaces thereof, wherein said base plate and said top plate are combined so that said first transparent electro conductive layer and said second transparent electro conductive layer face each other securing a certain specified clearance; and (c) a plurality of dot spacers located in between said base plate and said top plate, said dot spacers are made of a composite resin created through reaction of a flexible modified epoxy compound, an ordinary epoxy compound, a curing agent and an auxiliary additive, said dot spacers having a hardness of not more than 95 according to JIS-K6301-A, wherein a pressure given from the other surface of said top plate makes said second transparent electro conductive layer placed on said top plate touch said first transparent electro conductive layer placed on said base plate to indicate a place where said pressure is given, wherein each of said plurality of dot spacers is installed at a certain interval and with a predetermined height in order to insure a clearance between said base plate and said top plate, and wherein said flexible modified epoxy compound is at least one selected from the group consisting of rubber-modified epoxy compound, polyether-modified epoxy compound, fatty-acid-modified epoxy compound, polythiol-modified epoxy compound, and silicone-resin-modified epoxy compound, and wherein said rubber-modified epoxy compound is modified epoxy compound modified with at least one selected from the group consisting of urethane rubber, polybutadiene rubber, polyisoprene rubber and polyether rubber.

9. A transparent touch panel according to claim 8, wherein said ordinary epoxy compound is at least one selected from the group consisting of a bisphenol type epoxy compound, a novolak type epoxy compound, a cyclo-aliphatic epoxy compound, a naphthalen type epoxy compound, a glycidyl ester type epoxy compound and a glycidyl amine type epoxy compound.

10. A transparent touch panel according to claim 9, wherein said auxiliary additive is at least one selected from the group consisting of a organic polymer compound, a filler, a plasticizer and a coupling agent.

11. A transparent touch panel comprising:
(a) a base plate having a first transparent electro conductive layer on one of the surfaces thereof;
(b) a top plate having a second transparent electro conductive layer on one of the surfaces thereof, wherein said base plate and said top plate are combined so that said first transparent electro conductive layer and said second transparent electro conductive layer face each other securing a certain specified clearance; and
(c) a plurality of dot spacers located in between said base plate and said top plate, said dot spacers made of a composite resin produced through a reaction of a flexible modified epoxy compound, a bisphenol-A type epoxy compound and a curing agent,
wherein a pressure given from the other surface of said top plate makes said second transparent electro conductive layer placed on said top plate touch said first transparent electro conductive layer placed on said base plate to indicate a place where said pressure is given,
wherein each of said plurality of dot spacers is installed at a certain interval and with a predetermined height,
wherein a hardness of said dot spacers is not more than 95 in accordance with the test method specified in JIS-K6301-A,
wherein said flexible modified epoxy compound is at least one selected from the group consisting of rubber-modified epoxy compound, polyether-modified epoxy compound, fatty-acid-modified epoxy compound, polythiol-modified epoxy compound, and silicone-resin-modified epoxy compound, and
wherein said rubber-modified epoxy compound is modified epoxy compound modified with at least one selected from the group consisting of urethane rubber, polybutadiene rubber, polyisoprene rubber and polyether rubber.

12. A transparent touch panel comprising:
(a) a base plate having a first transparent electro conductive layer on one of the surfaces thereof;
(b) a top plate having a second transparent electro conductive layer on one of the surfaces thereof, where said base plate and said top plate are combined so that said first transparent electro conductive layer and said second transparent electro conductive layer face each other securing a certain specified clearance; and
(c) a plurality of dot spacers located in between said base plate and said top plate, said dot spacers made of a composite resin produced through a reaction of a fatty-acid-modified epoxy compound, a bisphenol-A type epoxy compound, a curing agent and an organic polymer compound,
wherein a pressure given from the other surface of said top plate makes said second transparent electro conductive layer placed on said top plate touch said first transparent electro conductive layer placed on said base plate to indicate a place where said pressure is given,
wherein each of said plurality of dot spacers is installed at a certain interval and with a predetermined height, and
wherein a hardness of said dot spacers is not more than 95 in accordance with the test method specified in JIS-K6301-A.

13. A transparent touch panel comprising:
(a) a base plate having a first transparent electro conductive layer on one of the surfaces thereof;
(b) a top plate having a second transparent electro conductive layer on one of the surfaces thereof, wherein said base plate and said top plate are combined so that said first transparent electro conductive layer and said second transparent electro conductive layer face each other securing a certain specified clearance; and
(c) a plurality of dot spacers located in between said base plate and said top plate, said dot spacers made of a composite resin produced through reaction of a polyether-modified epoxy compound, a bisphenol-A type epoxy compound, a curing agent and a filler,
wherein a pressure given from the other surface of said top plate makes said second transparent electro conductive layer placed on said top plate touch said first transparent electro conductive layer placed on said base plate to indicate a place where said pressure is given,
wherein each of said plurality of dot spacers is installed at a certain interval and with a predetermined height, and
wherein a hardness of said dot spacers is not more than 95 in accordance with the test method specified in JIS-K6301-A.

14. A method for forming a transparent touch panel, comprising:
(a) forming a transparent base plate;
(b) placing a transparent electro conductive layer on a surface of said transparent base plate;
(c) forming a transparent top plate;
(d) placing a second transparent electro-conductive layer on a surface of said transparent top plate;
(e) positioning said top plate a specified distance above said base plate with said first and second transparent electro-conductive layers facing each other;
(f) installing a plurality of dot spacers at a certain interval and with a predetermined height in order to insure a clearance between said base plate and said top plate from a composite resin including a flexible modified epoxy resin, a hardness of said dot spacers being not more than 95 in accordance with the test method specified in JIS-K6301-A,
(g) placing said dot spacers between said first and said second transparent electro-conductive layers; and
(h) gluing said base plate and top plates together,
said dot spacers made of a composite resin, including a flexible modified epoxy resin, said modified epoxy resin is a resin produced through a chemical reaction between a curing agent and at least one modified epoxy compound selected from the group consisting of rubber-modified epoxy compound, polyether-modified epoxy compound, fatty-acid-modified epoxy compound, polythiol-modified epoxy compound and silicone-resin-modified epoxy compound, and said rubber-modified epoxy compound is modified epoxy compound modified with at least one selected from the group consisting of urethane rubber, polybutadiene rubber, polyisoprene rubber and polyether rubber.

15. A transparent touch panel comprising:

(a) a base plate having a first transparent electro conductive layer on one of the surfaces thereof:

(b) a top plate having a second transparent electro conductive layer on one of the surfaces thereof, wherein said base plate and said top plate are combined so that said first transparent electro conductive layer and said second transparent electro conductive layer face each other securing a certain specified clearance; and (c) a plurality of dot spacers located in between said base plate and said top plate, said dot spacers made of a composite resin including a flexible modified epoxy resin, wherein the dot spacers are fixed on the base plate at 8 mm pitch and 30 um height through a curing process, and wherein the hardness of said dot spacers is not more than 95 in accordance with the test method specified in JIS-K6301-A.

* * * * *

UNITED STATES PATENT AND TRADEMARK OFFICE
CERTIFICATE OF CORRECTION

PATENT NO. : 5,955,198
DATED : September 21, 1999
INVENTOR(S) : Hashimoto et al.

It is certified that error appears in the above-identified patent and that said Letters Patent is hereby corrected as shown below:

Title Page:

In the "Assignee" section, after "Electric", insert --Industrial--.

Signed and Sealed this

Second Day of October, 2001

*Attest:*

NICHOLAS P. GODICI
*Attesting Officer*     *Acting Director of the United States Patent and Trademark Office*